United States Patent
Shverdin et al.

(10) Patent No.: US 12,117,292 B1
(45) Date of Patent: Oct. 15, 2024

(54) LASER ARCHITECTURE FOR COMPONENT EFFICIENT ATOMIC INTERFEROMETER GRAVIMETER

(71) Applicant: AOSense, Inc., Sunnyvale, CA (US)

(72) Inventors: Miroslav Y. Shverdin, Mountain View, CA (US); Matthew Cashen, Gilroy, CA (US); Micah Ledbetter, Sunnyvale, CA (US); Michael R. Matthews, Palo Alto, CA (US); Alexander F. Sugarbaker, Atherton, CA (US)

(73) Assignee: AOSense, Inc., Fremont, CA (US)

( * ) Notice: Subject to any disclaimer, the term of this patent is extended or adjusted under 35 U.S.C. 154(b) by 1345 days.

(21) Appl. No.: 16/678,796

(22) Filed: Nov. 8, 2019

(51) Int. Cl.
*G01B 9/02* (2022.01)
*G01V 7/02* (2006.01)
*G21K 1/00* (2006.01)

(52) U.S. Cl.
CPC ............... *G01B 9/02* (2013.01); *G01V 7/02* (2013.01); *G21K 1/006* (2013.01)

(58) Field of Classification Search
None
See application file for complete search history.

(56) References Cited

U.S. PATENT DOCUMENTS

| | | | |
|---|---|---|---|
| 2014/0190254 A1* | 7/2014 | Bouyer | G01V 7/04 73/382 G |
| 2016/0178792 A1* | 6/2016 | Kasevich | G01V 7/14 73/382 R |
| 2017/0299389 A1* | 10/2017 | Johnson | G01P 15/08 |
| 2020/0161446 A1* | 5/2020 | Anderson | H01L 29/66439 |

OTHER PUBLICATIONS

Gauguet et al., 'Off-resonant Raman transition impact in an atom interferometer', Oct. 29, 2008, Physical Review A, 78 (Year: 2008).*

* cited by examiner

*Primary Examiner* — Eliza W Osenbaugh-Stewart
(74) *Attorney, Agent, or Firm* — Van Pelt, Yi & James LLP

(57) ABSTRACT

A system for atom interferometry includes one or more lasers disposed to 1) generate a first pair of beams that are initially spatially separated and later overlapped to follow a common path to intersecting an atomic cloud interaction region, wherein the first beam of the pair of beams acts as a first MOT beam and the second beam of the pair of beams acts as a first Raman beam; and 2) generate an additional beam, wherein the additional beam is multiplexed to be used alternately as a second MOT beam and as a second Raman beam, wherein the additional beam follows an opposing path to the common path when intersecting the atomic cloud interaction region.

16 Claims, 13 Drawing Sheets

LASER ARCHITECTURE FOR COMPONENT EFFICIENT ATOMIC INTERFEROMETER GRAVIMETER

BACKGROUND OF THE INVENTION

Atom interferometers exploit the wave-like properties of atoms to sensitively measure small differences between different atomic spatial trajectories. Generally, this is done by measuring interference effects as part of an atomic interferometer that result when a beam of atoms is manipulated such that the atomic wave packets are split into two or more components and subsequently recombined. These wave-like properties of matter allow interference measurements to be exploited at a scale orders of magnitude smaller than for light because the typical de Broglie wavelengths associated with massive particles are very small compared to wavelengths associated with massless photons of visible light. One important application of atomic interferometers is in the construction of gravimeters. Applications of gravimeters include precision inertial sensing for navigation, geodesy, metrology, seismology, petroleum and mineral prospecting, geophysical surveys, and geophysical research. All these applications benefit from a gravimeter design that is small and highly mobile. A light-pulse atomic interferometer uses optical pulses that interact with ensembles of atoms (e.g., a ball or group of atoms launched from a magneto-optic trap or from an atomic beam). To realize an atomic interferometer, multiple laser beams (e.g. magneto-optic trap (MOT) beams and Raman beams) with specific frequency and polarization properties are utilized. Generation and routing of these beams can take up considerable space in a device when multiple lasers and separate beam paths are used. Large device size however, restricts the utility of the device for mobile applications.

BRIEF DESCRIPTION OF THE DRAWINGS

Various embodiments of the invention are disclosed in the following detailed description and the accompanying drawings.

DETAILED DESCRIPTION

Figure 1:
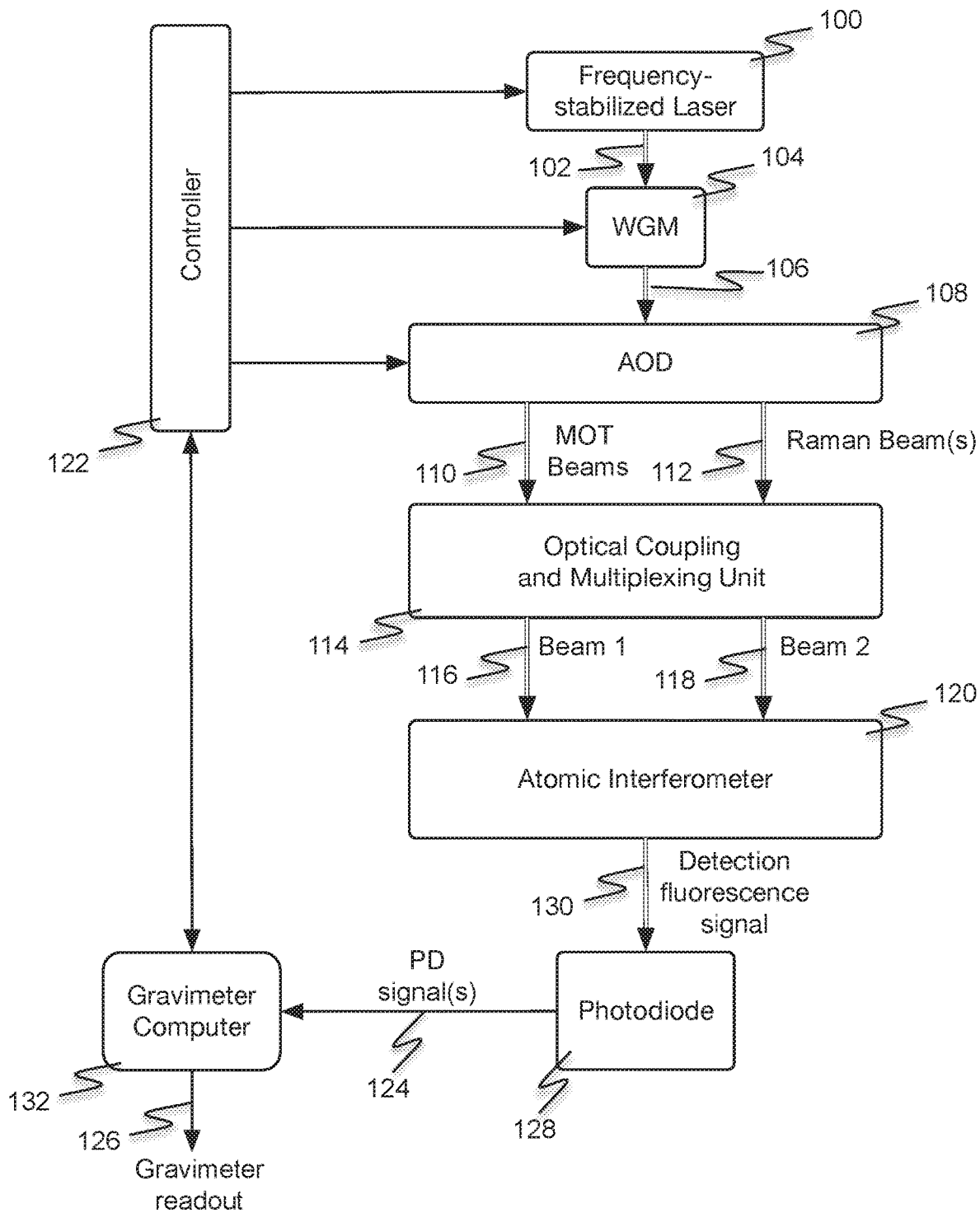
FIG. 1 is a block diagram illustrating an embodiment of an atom interferometer system utilizing beam sharing and multiplexing to realize a compact device for atom trapping and atomic interferometry.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for beam sharing and multiplexing to realize atom trapping and interferometry is disclosed. The system comprises one or more lasers that are disposed to generate a first pair of beams and an additional beam. The first pair of beams are initially spatially separated and later overlapped to follow a common path to intersecting an atomic cloud interaction region, where the first beam of the pair of beams acts as a first magneto-optical trap (MOT) beam and the second beam of the pair of beams acts as a first Raman beam. The additional beam is multiplexed to be used alternately as a second MOT beam and as a second Raman beam, where the additional beam follows an opposing path to the common path when intersecting the atomic cloud interaction region. For example, a frequency-stabilized laser generates a beam that is passed sequentially through a wave guide modulator (WGM) and through an acousto-optic deflector (AOD) in order to generate MOT and Raman beams. The MOT and Raman beams are optically coupled and multiplexed before entering an atomic cloud interaction region of the atomic interferometer, where a fluorescence signal is detected using a photodiode (PD). The PD signal contains information about the quantum population states of the atoms and is used by a gravimeter computer to compute an estimate of the local gravitational field along one or more axes.

FIG. 1 is a block diagram illustrating an embodiment of an atom interferometer system utilizing beam sharing and multiplexing to realize a compact device for atom trapping and atomic interferometry. In the example shown, the interferometer system comprises controller 122, frequency-stabilized laser 100, wave guide modulator (WGM) 104, acousto-optic deflector (AOD) 108, optical coupling and multiplexing unit 114, atomic interferometer 120, photodiode 128, and gravimeter computer 132. Frequency-stabilized laser 100 outputs frequency-stabilized beam 102 for input into WGM 104. For example, the laser system employs a master oscillator power amplifier (MOPA) architecture under the control of controller 122. Seed light for the system derives from an external-cavity diode laser (ECDL) offset-locked from the cooling transition using saturation spectroscopy. WGM 104 receives beam 102 and outputs beam 106 for input to AOD 108. For example, broadband WGM 104 frequency-shifts light from beam 102 under the control of controller 122 to near the cooling transition of the atoms in the atomic interferometer 120. AOD 108 receives beam 106 and outputs MOT beams 110 and Raman beams 112. For example, AOD 108 switches light between MOT beams 110 and Raman beam 112 paths under the control of controller 122 which are subsequently routed though optical coupling and multiplexing unit 114 before entering the atomic interferometer 120. In some embodiments, controller 122 changes the beam properties sequentially for the measurement cycle states: MOT cooling, atomic state preparation, Raman interferometry, and fluorescence detection. In some embodiments, MEMS switches are used for switching beams. Optical coupling and multiplexing unit 114 receive MOT beams 110 and Raman beam(s) 112 and outputs beam 1 (116) and beam 2 (118) for input into atomic interferometer 120. For example, beam 1 (116) contains a MOT beam and beam 2 (118) contains a pair of orthogonally polarized Raman beams. Atomic interferometer 120 receives beam 1 (116) and beam 2 (118) and outputs detection fluorescence signal 130. For example, within atomic interferometer 120, a racetrack assembly routes the Raman light to induce Doppler-sensitive Raman transitions. Within atomic interferometer 120, the MOT beams are counter-propagating and have the same circular polarization while the Raman beams have opposite polarizations. Photodiode 128 receives detection fluorescence signal 130 and outputs PD signal(s) 124 for input to gravimeter computer 132. Under the control of controller 122, gravimeter computer 132 outputs gravimeter readout 126 that contains information about the local gravitational field strength and direction.

Figure 2:
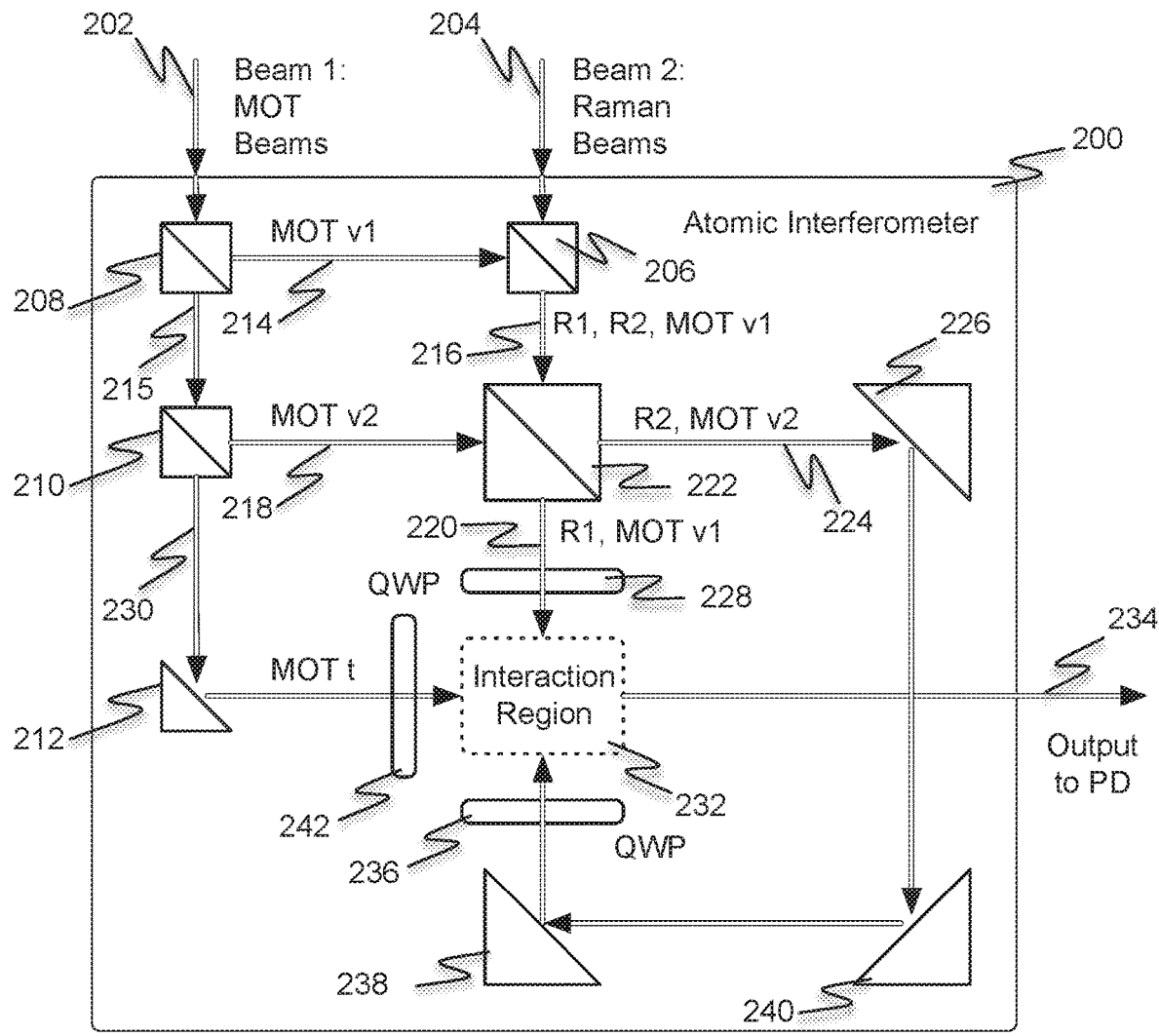
FIG. 2 is a block diagram illustrating an embodiment of an atomic interferometer.

FIG. 2 is a block diagram illustrating an embodiment of an atomic interferometer. In some embodiments, atomic interferometer 200 of FIG. 2 is used to implement atomic interferometer 120 of FIG. 1. In the example shown, the atomic interferometer comprises interaction region 232 polarizing beam-splitter cube (PBS) 222, quarter wave plate (QWP) 228, QWP 242, QWP 236, and optical elements for routing the beams including non-polarizing beam-splitter (NPBS) 206, NPBS 208, NPBS 210, and mirror 212, mirror 226, mirror 238, and mirror 240.

Beam 2: Raman beams 204 is made up of two orthogonally polarized Raman beams (R1 and R2). For example, R1, the first Raman beam, is linearly polarized and R2, the second Raman beam, is linearly polarized orthogonal to R1. Beam 2: Raman beams 204 pass through NPBS 206 before entering PBS 222. PBS 222 splits R1 and R2. For example, R1 transmits through a polarizing beam splitter and R2 reflects 90 degrees by the polarizing beam splitter. In some embodiments, beam 2: Raman beams 204 is produced by overlapping two beams with the same polarization, but with different frequencies which are turned on and off to mimic a single beam whose frequency is changed.

Beam 2: Raman beams 204 co-propagate to PBS 222. R1 transmits through PBS 222 and R2 reflects off the PBS. R1 travels in one direction to intersect interaction region 232, and R2 is routed by mirrors in another direction to intersect interaction region 232 from the opposite side compared to R1. In some embodiments, R2 is routed by prisms instead of mirrors. For example, mirror 226, mirror 238, and mirror 240 are bonded to a glass substrate such as Zerodur. Zerodur has nearly zero coefficient of thermal expansion which insures that the optical path of the two beams does not drift appreciably during the interferometer measurement. QWP 228 and QWP 236 produce proper beam polarization for the interferometer beams in interaction region 232. In some embodiments, R1 transmits through QWP 228 prior to intersecting interaction region 232 where the atomic cloud is located and R2 transmits through QWP 236 prior to intersecting interaction region 232, where R1 and R2 have opposite circular polarizations when intersecting interaction region 232. For example, beam 220 (that includes R1 or MOT_v1) passes through QWP 228 before entering interaction region 232 and beam 224 (that includes R2 or the second cooling beam, MOT_v2) passes through QWP 236 before entering interaction region 232.

For the atom cooling stage, R2 is turned off and R1 is either turned off, or, in some embodiments, re-used as one of the vertical cooling beams. MOT_v2 enters through the second port of PBS 222. This results in the two beams after PBS 222 having the same polarization and ensures that the beams are properly polarized for the atom cooling stage. During cooling, the frequency of R1 is made the same as the frequency of MOT_v2.

Three MOT beams, the first cooling beam (MOT_v1, MOT_v2), and the transverse cooling beam (MOT_t) enter interaction region 232. MOT_v2 comes in from the side of PBS 222 and follows the same path as R2 but with the opposite polarization. MOT_v1, which is combined with the R1 and R2 in NPBS 206, comprises a vertical MOT beam that has the same polarization and path as R1. This results in MOT_v1 and MOT_v2 counter-propagating in interaction region 232 and provides the MOT cooling/trapping in the vertical direction (i.e., the same as the direction of propagation of the Raman beams at the atoms). In some embodiments, R1 is re-used as MOT beam MOT_v1 after changing frequency to match MOT_v2 beam where R2 is turned off.

In some embodiments, beam 218, or MOT_v2, is linearly polarized and is transmitted through a polarizing beam splitter orthogonal to MOT_v1, which is part of beam 216 that is also transmitted through PBS 222. In some embodiments, MOT_v1, which is part of beam 216, on the common path transmits through QWP 228 prior to intersecting interaction region 232 and MOT_v2, which is part of beam 224, on the opposing path transmits through a second quarter wave plate 236 prior to intersecting interaction region 232, where MOT_v1 and MOT_v2 have identical circular polarizations when intersecting interaction region 232.

MOT_t, which comprises beam 230, arrives in the same plane as MOT_v1 and MOT_v2 but is race-tracked around and retro-reflected to provide MOT confinement in the other two dimensions (horizontal and into/out of the page (not shown in FIG. 2)). MOT_t passes through QWP 242 before entering interaction region 232. In some embodiments, beam 204 is generated by two separate lasers that generate two separate beams R1 and R2 that are combined such that the two beams R1 and R2 follow the common path of beam 216.

A detection fluorescence signal 234 containing information about the atomic states of the atoms in interaction region 232 is sent to a photodiode (PD) for measurement. In some embodiments, interaction region 232 is enclosed in a magnetic shield made of mu metal. In some embodiments, interaction region 232 is within a vacuum chamber.

Figure 3:
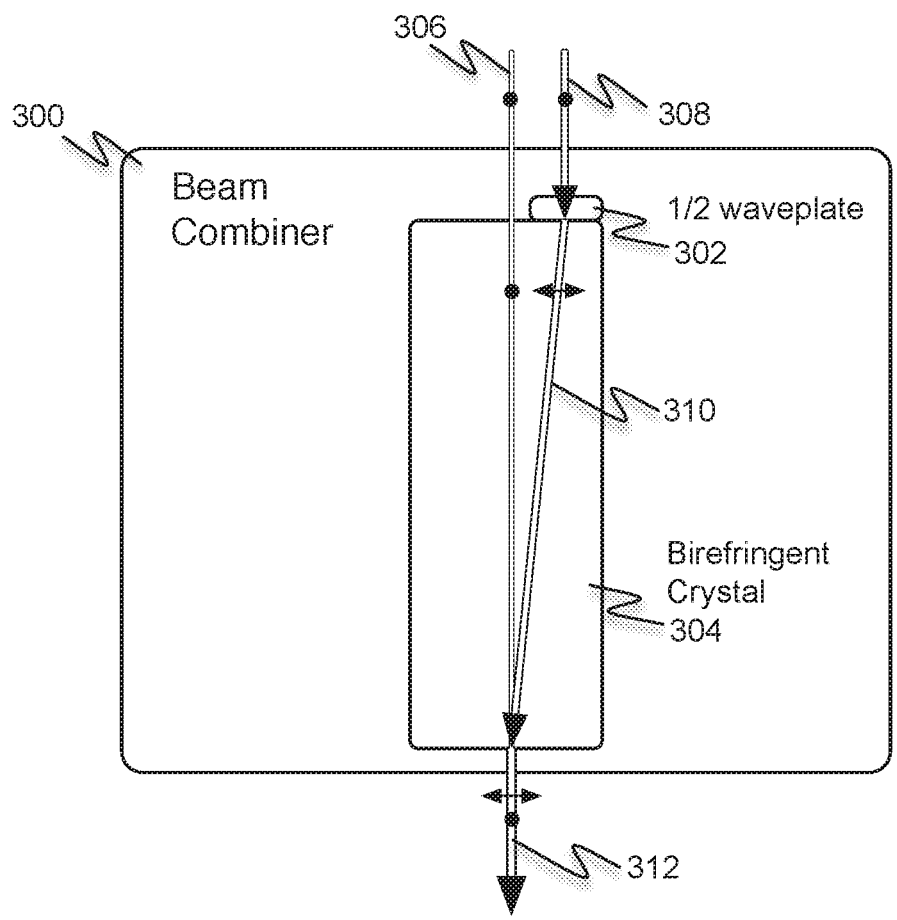
FIG. 3 is a block diagram illustrating an embodiment of a beam combiner for combining and overlapping two distinct beams.

FIG. 3 is a block diagram illustrating an embodiment of a beam combiner for combining and overlapping two distinct beams. In the example shown, beam combiner 300 comprises birefringent crystal 304 and ½ wave plate 302. In various embodiments, birefringent crystal comprises one of the following: a $TiO_2$ crystal, a $YVO_4$ crystal, a $CaCO_3$ crystal, a $PbMoO_4$ crystal, a $TeO_2$ crystal, a $LiNbO_3$ crystal, a $MgF_2$ crystal, a SiO2 crystal, or any other appropriate crystal.

Beam 308 passes through ½ wave plate 302 before entering birefringent crystal 304. Beam 308 and beam 306 are combined in birefringent crystal 304 and exit as combined beam 312. In some embodiments, one laser is configured to generate an output beam and an acousto-optic deflector is disposed to generate two diffracted beams that are spatially offset with identical polarizations. For example, two Raman beams produced by two diffraction spots of an acousto-optic deflector travel along similar paths. After the two diffraction spots are produced, they enter beam combiner 300 as beam 306 and beam 308. Beam combiner 300 overlaps the two Raman beams such that they co-propagate co-linearly and exit as combined beam 312. In some embodiments, the two diffracted beams are spatially offset by approximately two beam diameters on entry to the birefringent crystal.

In some embodiments, a birefringent crystal is disposed to receive the two diffracted beams, where one of the two diffracted beams are passed through half wave plate 302 so that the two diffracted beams have orthogonal polarizations. Birefringent crystal 300 is further disposed and selected in size to enable the two diffracted beams to re-overlap upon exiting birefringent crystal 300 by having one of the two diffracted beams walk toward the other of the two diffracted beams in birefringent crystal 300, where the two diffracted beams have minimal path length differences so that the two diffracted beams are useable for interferometry.

Birefringent crystals have been used previously for beam displacement where the extraordinary polarized beam experiences spatial walk-off when propagating at some angle with respect to the optical axis. The amount of walk-off depends on the propagation length through the crystal and the walk-off angle. The walk-off angle is a function of the magnitude of the refractive index, the angular dispersion of the refractive index, and the angle of the beam with respect to the optical axis of the crystal. In contrast to prior use however, beam combiner 300 uses the beam displacement birefringent crystal in reverse, matching the walk-off distance to the initial beam separation. For example, when Raman beams are derived from acousto-optic diffraction, they have the same polarization. ½-wave plate 302 is bonded to birefringent crystal 300 and makes two offset beams orthogonally polarized inside birefringent crystal 300. As a result, one of the offset beams walks toward the other offset beam, producing an orthogonally polarized overlapped pair of beams that exit as combined beam 312. Orthogonal polarization of co-propagating Raman beams is a useful feature because shared beam paths can be used to reduce overall device size and downstream the two beams can be separated as needed using a polarizing beam splitter.

Figure 4:
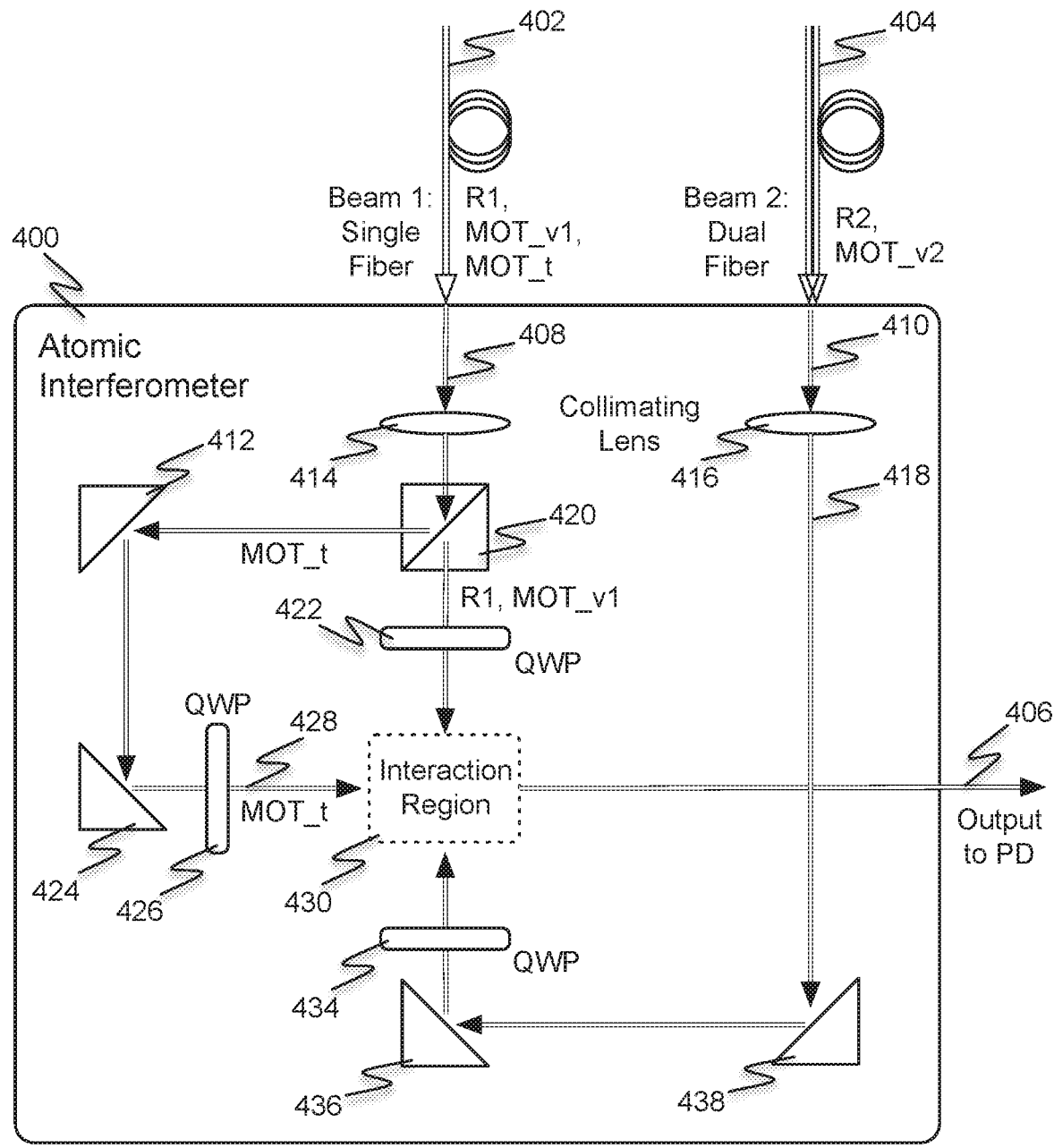
FIG. 4 is a block diagram illustrating an embodiment of an atomic interferometer utilizing beam multiplexing to realize a lossless implementation of both Raman interferometry and atom cooling.

FIG. 4 is a block diagram illustrating an embodiment of an atomic interferometer utilizing beam multiplexing to realize a lossless implementation of both Raman interferometry and atom cooling. In some embodiments, atomic interferometer 400 of FIG. 4 is used to implement atomic interferometer 120 of FIG. 1. In the example shown, atomic interferometer 400 comprises interaction region 430, collimating lens 414, collimating lens 416, quarter wave plate (QWP) 422, QWP 426, QWP 434, and optical elements for routing the beams including non-polarizing beam-splitter (NPBS) 420, and mirror 412, mirror 424, mirror 436, and mirror 438. In some embodiments, interaction region 430 is enclosed in a magnetic shield made of mu metal. In some embodiments, interaction region 430 is within a vacuum chamber.

In some embodiments, Raman beam R1 and MOT cooling beams MOT_v1 and MOT_t are transmitted through a single fiber and make up beam 408, where beam 408 is collimated and passed through quarter wave plate (QWP) 422 before intersecting an atomic cloud located in interaction region 430. For example, light exits single fiber 402 as beam 408 in atomic interferometer 400 and is collimated by lens 414. Beam 408 doubles as both MOT cooling beams (MOT_v1 and MOT_t) and as Raman beam R1 for the interferometer. For example, since the Raman beam R1 and MOT_v1 share the same path through QWP 422, in order to end up with opposite circular polarizations, they need to start out with opposite linear polarizations. A portion of beam 408 passes through beam splitter 420 and QWP 422 before entering the interaction region 430. During the cooling phase, a portion of beam 408 containing MOT_t is reflected by beam splitter 420 and routed by mirror 412 and mirror 424 to QWP 426 before entering as beam 428 into interaction region 430. Within interaction region 430, MOT_t arrives in the same plane as MOT_v1 and MOT_v2 but is race-tracked around and retro-reflected to provide MOT confinement in the other two dimensions (horizontal and into/out of the page—not shown in FIG. 4).

In some embodiments, a pair of beams (e.g., R2 and MOT_v2) have orthogonal linear polarizations, where the pair of beams are transmitted through dual fiber array 404 and where the pair of beams are collimated and are passed through QWP 434 to become two opposite-circularly polarized beams before intersecting an atomic cloud in interaction region 430. Note that beam 410 exits dual-fiber array 404 and is collimated by lens 416 on the way as beam 418 to interaction region 430. In some embodiments, the fiber pitch of dual-fiber array 404 can be as small as 125 um. This fiber pitch introduces only a small angular tilt in one of the beams so that both beams travel along essentially the same physical path. The two beams of the pair of beams are orthogonally polarized after dual-fiber array 404. After collimation by lens 416, the pair of beams are routed by mirror 438 and mirror 436 to QWP 434 where they become opposite-circularly polarized before entering interaction region 430. Due to polarization selection rules, the beam of the pair of beams that has the same handedness as beam 408 is the MOT cooling beam (MOT_v2). The beam of the pair of beams that has the opposite handedness is the interferometer beam—Raman beam R2.

Figure 5:
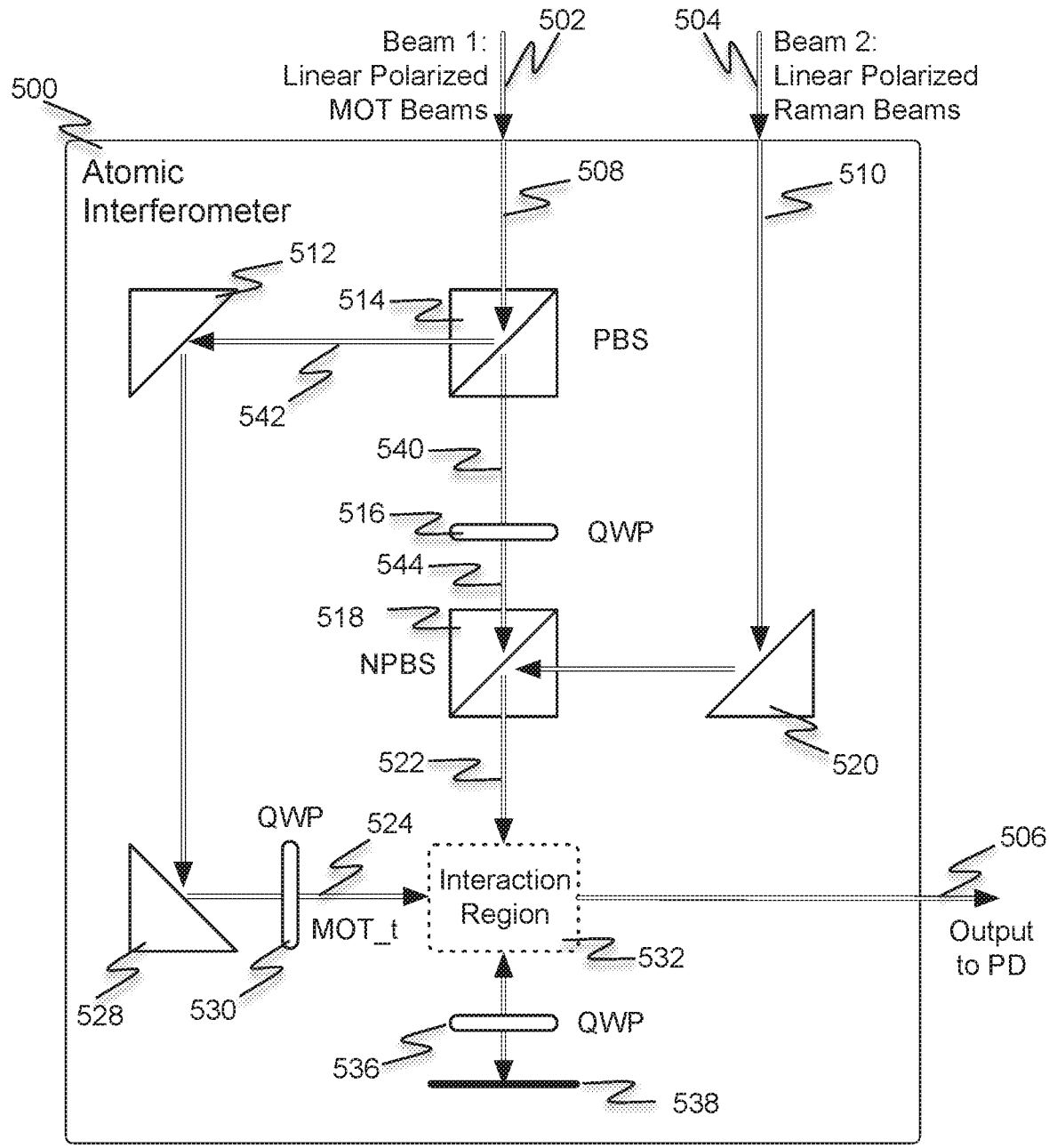
FIG. 5 is a block diagram illustrating an embodiment of an atomic interferometer utilizing beam multiplexing to reduce overall device size.

FIG. 5 is a block diagram illustrating an embodiment of an atomic interferometer utilizing beam multiplexing to reduce overall device size. In some embodiments, atomic interferometer 500 of FIG. 5 is used to implement atomic interferometer 120 of FIG. 1. In the example shown, atomic interferometer 500 comprises interaction region 532, polarizing beam-splitter cube (PBS) 514, non-polarizing beam-splitter cube (NPBS) 518, quarter wave plate (QWP) 516, QWP 530, QWP 536, retro-reflective mirror 538, and optical elements for routing the beams including mirror 520, mirror 512, and mirror 528. In some embodiments, interaction region 532 is enclosed in a magnetic shield made of mu metal. In some embodiments, interaction region 532 is within a vacuum chamber. In some embodiments, interaction region 532, retro-reflective mirror 538, and QWP 536 are enclosed in a magnetic shield made of mu metal. In some embodiments, interaction region 532, retro-reflective mirror 538, and QWP 536 are within a vacuum chamber.

The system for atom interferometry comprises one or more lasers disposed to generate first Raman linearly polarized beam 504 that travels along path 510. Path 510 is reflected off of mirror 520 and again by NPBS 518 to travel on path 522. After passing through the atomic cloud in interaction region 532, first Raman linearly polarized beam 504 passes through QWP 536 and then reflects back using mirror 538 through QWP 536 to re-intersect the atomic cloud in interaction region 532 as a second Raman linearly polarized beam, where the second Raman linearly polarized beam is orthogonally polarized to first Raman linearly polarized beam 504 when re-intersecting the atomic cloud in interaction region 532.

The system for atom interferometry comprises one or more lasers disposed to generate MOT beams 502, which includes a first MOT beam that is linearly polarized and propagates along path 508. The first MOT beam transmits through PBS 514 along path 540 and through QWP 516 to become circularly polarized. The first MOT beam, now circularly polarized, propagates along path 544 through NPBS 518 and along path 522 to intersect the atomic cloud in interaction region 532. After the first MOT circularly polarized beam passes through the atomic cloud in interaction region 532, the first MOT circularly polarized beam passes through QWP 536 and then reflects back through QWP 536 to re-intersect the atomic cloud in interaction 532 region as a second MOT circularly polarized beam, where the second MOT circularly polarized beam has the same circular polarization as the first MOT circularly polarized beam when re-intersecting the atomic cloud in interaction region 532.

In some embodiments, first Raman linearly polarized beam 504 and the first MOT circularly polarized beam are able to travel along an overlapping optical path (path 522) to intersect the atomic cloud in interaction region 532.

In some embodiments, first Raman linearly polarized beam 504 and the first MOT circularly polarized beam are directed along an overlapping optical path (path 522) by being combined using NPBS 518.

The system for atom interferometry comprises one or more lasers disposed to generate MOT beams 502, which includes a MOT_t beam which is linearly polarized and propagates along path 508. The MOT_t beam is reflected by PBS 514 along 542, reflected off of mirror 512 and mirror 528 before being transmitted through QWP 530 to become circularly polarized along path 524. The circularly polarized MOT_t beam then intersects an atomic cloud in interaction region 532. The circularly polarized MOT_t beam arrives in the same plane as the first and second MOT circularly polarized beam but is race-tracked around and retro-reflected to provide MOT confinement in the other two dimensions (horizontal and into/out of the page (not shown in FIG. 5)). The state of the atomic cloud in interaction region 532 is detected using the signal detected by a photodetector with light propagating along path 506.

In some embodiments MOT beam 502 is circularly polarized, beam splitter 514 is a non-polarizing beam splitter, and quarter wave plate 516 and quarter wave plate 530 are absent.

Figure 6:
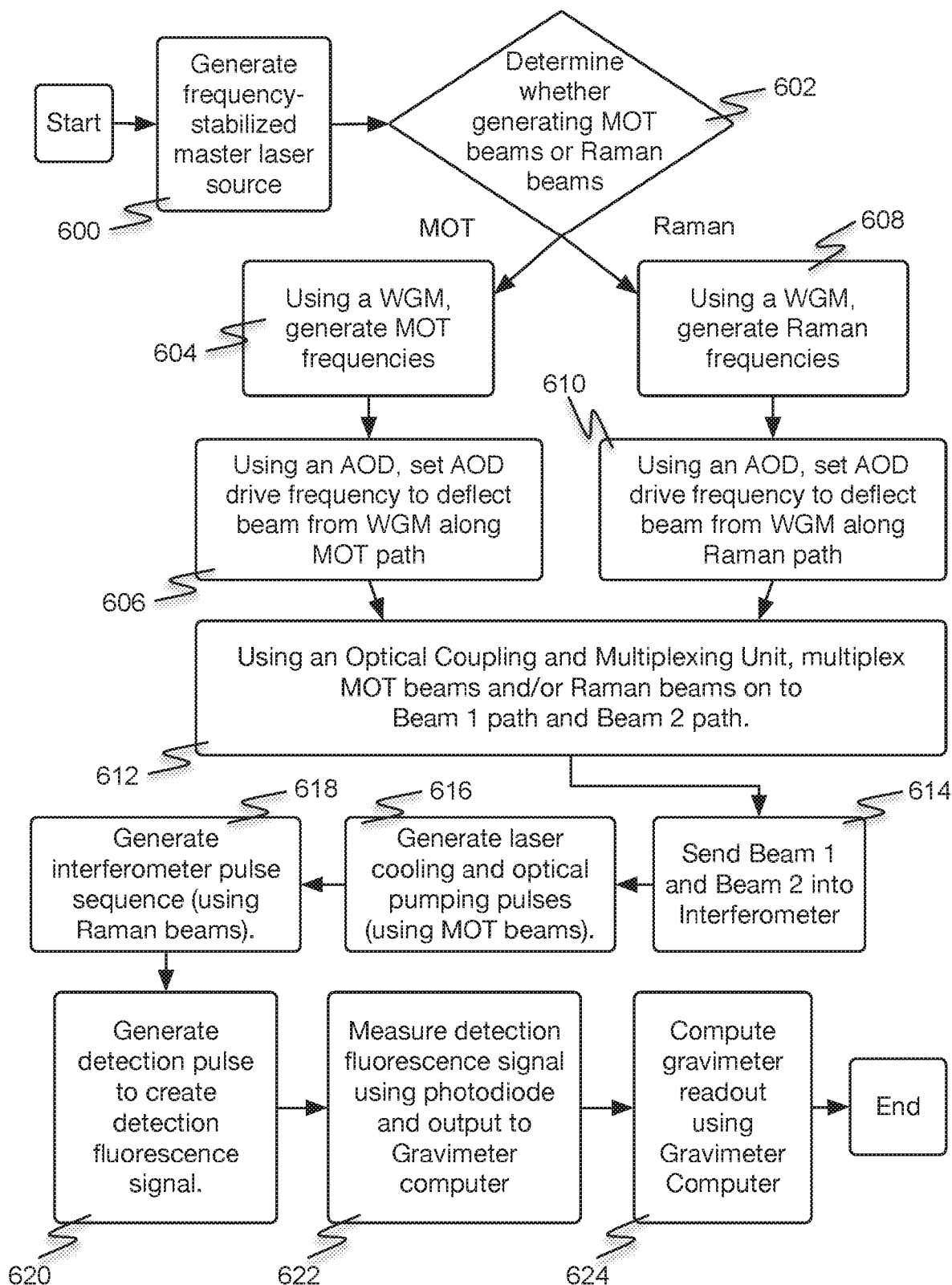
FIG. 6 is a flow diagram illustrating an embodiment of an atomic interferometer system for making local measurements of gravity.

FIG. 6 is a flow diagram illustrating an embodiment of an atomic interferometer system for making local measurements of gravity. In some embodiments, the process of FIG. 6 is executed by the system of FIG. 1. In the example shown in 600, a frequency-stabilized master laser source is generated. For example, the laser system employs a master oscillator power amplifier (MOPA) architecture with seed light derived from an external-cavity diode laser (ECDL) offset-locked from the cooling transition using saturation spectroscopy. In 602, it is determined whether the system is generating MOT beams or Raman beams. If the system is generating MOT beams, the process branches to 604. If the system is generating Raman beams, the process branches to 608.

In 604, MOT frequencies are generated using a WGM. For example, the laser beam is sent into a WGM which modulates the laser light at a frequency optimized for the magneto-optical trapping stage, and control passes to 606. In 606, the AOD drive frequency is set to direct the laser beam coming out of the WGM to be along the MOT path, and control passes to 612. In 608, Raman frequencies are generated using a WGM. For example, the laser beam is sent into a WGM which modulates the laser light at a frequency optimized for the Raman spectroscopy stage, and control passes to 610. In 610, the AOD drive frequency is set to direct the laser beam coming out of the WGM to be along the Raman path, and control passes to 612.

In 612, MOT beams and/or Raman beams are multiplexed onto Beam 1 path and Beam 2 path using an Optical Coupling and Multiplexing Unit. For example, Optical Coupling and Multiplexing Unit generates Beam 1 containing MOT beams and Beam 2 containing two orthogonally polarized Raman beams (R1 and R2) where the first Raman beam R1 is linearly polarized and the second Raman beam R2 is linearly polarized orthogonal to the first Raman beam R1.

In 614, Beam 1 and Beam 2 are sent into the atomic interferometer. In 616, laser cooling and optical pumping pulses (using MOT beams) are generated. For example, a controller unit sets the laser system to generate laser cooling and optical pumping pulses (using MOT beams). In 618, interferometer pulse sequence (using Raman beams) is generated. For example, a controller sets the laser system to generate an interferometer pulse sequence (using Raman beams).

In 620, a detection pulse is generated to create detection fluorescence signal. For example, a controller sets the laser system to generate a detection pulse sequence using Raman beams to create detection florescence signal. In 622, a detection fluorescence signal is measured using a photodiode (PD) and is output to Gravimeter computer. In 624, a gravimeter readout is computed using a Gravimeter Computer. For example, under the control of a controller, the laser system generates a detection pulse sequence and the controller instructs a gravimeter computer to compute an estimate of the local gravitational field using the measurement of the resulting PD signal.

Figure 7:
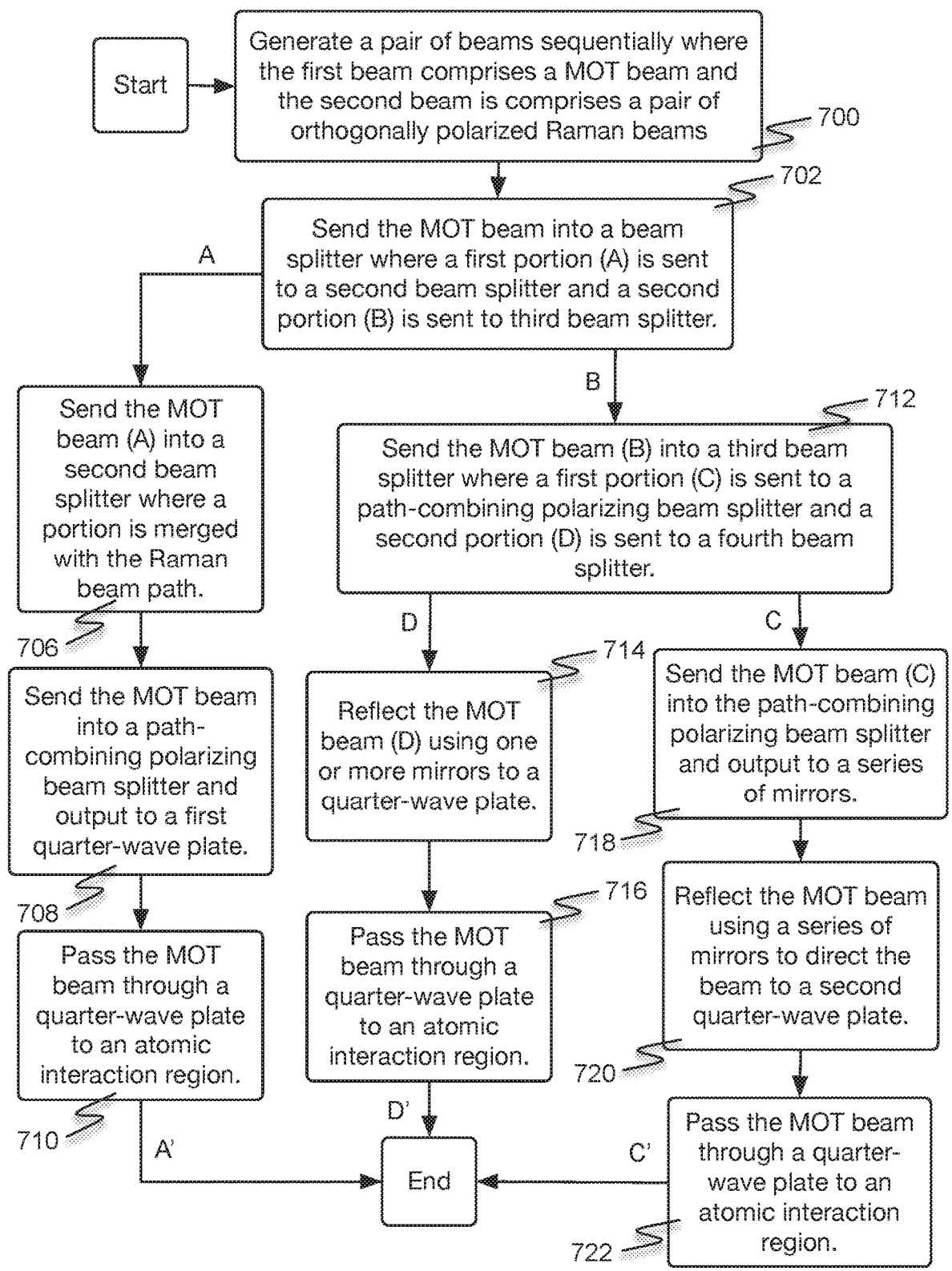
FIG. 7 is a flow diagram illustrating an embodiment of an atomic interferometer system.

FIG. 7 is a flow diagram illustrating an embodiment of an atomic interferometer system. In some embodiments, the process of FIG. 7 is executed by the atomic interferometer 120 of FIG. 1. In some embodiments, the process of FIG. 7 is executed by atomic interferometer 200 of FIG. 2 when MOT beams are being generated. In the example shown in 700, a pair of beams is generated sequentially where the first beam comprises a MOT beam and the second beam comprises a pair of orthogonally polarized Raman beams. For example, the first Raman beam R1 is linearly polarized and the second Raman beam R2 is linearly polarized orthogonal to R1.

In 702, the MOT beam is sent into a beam splitter where a first portion (A) is sent to a second beam splitter and a second portion (B) is sent to third beam splitter. In some embodiments, the first MOT beam portion (A) is beam 214 of FIG. 2, the second MOT beam portion (B) is beam 215 of FIG. 2, the second beam splitter is NPBS 206 of FIG. 2, and the third beam splitter is NPBS 210 of FIG. 2.

In 706, the MOT beam (A) is sent into a second beam splitter where it is merged with the Raman beam path. In some embodiments, the first portion (A) is MOT_v1 214 of FIG. 2, which is combined with Raman beams R1 and R2 in NPBS 206 of FIG. 2 and becomes beam 216 of FIG. 2 comprising a vertical MOT beam that has the same polarization and path as R1. In 708, the MOT beam is sent into a path-combining polarizing beam splitter and output to a first quarter-wave plate. In some embodiments, the path-combining polarizing beam splitter is PBS 222 of FIG. 2 and the first quarter-wave plate is QWP 228 of FIG. 2. In 710, the MOT beam is passed through a quarter-wave plate to an atomic interaction region. In some embodiments, the atomic interaction region is atomic interaction region 232 of FIG. 2.

In 712, the portion of the MOT beam (B) is sent into a third beam splitter where a first portion (C) is output to a path-combining polarizing beam splitter and a second portion (D) is output to a fourth beam splitter. In some embodiments, the first portion (C) is beam 218 of FIG. 2, the second portion (D) is beam 230 of FIG. 2, and the path-combining polarizing beam splitter is PBS 222 of FIG. 2.

In 714, the MOT beam (D) is reflected using one or more mirrors to a quarter-wave plate. In some embodiments, the mirror is mirror 212 of FIG. 2 and the quarter wave plate is QWP 242 of FIG. 2. In 716, the MOT beam is passed through a quarter-wave plate to an atomic interaction region. In some embodiments, the atomic interaction region is atomic interaction region 232 of FIG. 2.

In 718, the MOT beam (C) is sent into the path-combining polarizing beam splitter and output to a series of mirrors. In some embodiments, MOT beam (C) is beam is beam 218 of FIG. 2 and the path-combining polarizing beam splitter is PBS 222 of FIG. 2. In 720, the MOT beam is reflected using a series of mirrors to direct the beam to a second quarter-wave plate. In some embodiments, the series of mirrors are mirror 226, mirror 240 and mirror 238 of FIG. 2. In 722, the MOT beam is passed through a quarter-wave plate to an atomic interaction region. In some embodiments, the quarter wave plate is QWP 236 of FIG. 2 and the atomic interaction region is atomic interaction region 232 of FIG. 2.

In some embodiments, the interferometric measurement pulse sequence using MOT and Raman beams in the interaction region is followed by a detection pulse sequence to create a detection florescence signal that is measured by a photodiode (e.g., as in 622 of FIG. 6).

Figure 8:
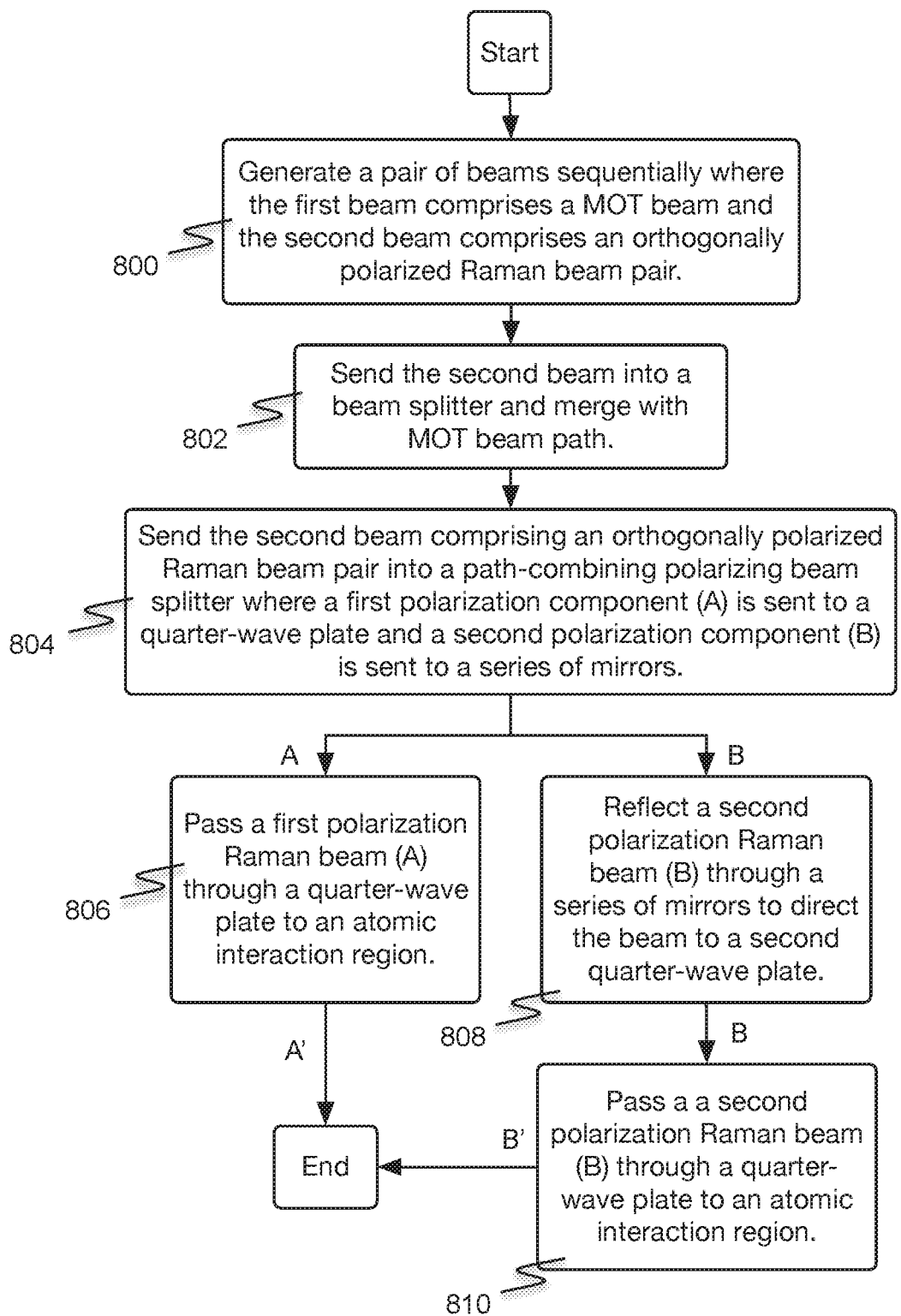
FIG. 8 is a flow diagram illustrating an embodiment of an atomic interferometer system.

FIG. 8 is a flow diagram illustrating an embodiment of an atomic interferometer system. In some embodiments, the process of FIG. 8 is executed by the atomic interferometer 120 of FIG. 1. In some embodiments, the process of FIG. 8 is executed by atomic interferometer 200 of FIG. 2 when Raman beams are being generated. In the example shown in 800, a pair of beams is generated sequentially where the first beam comprises a MOT beam and the second beam comprises a pair of orthogonally polarized Raman beams. For example, the first Raman beam R1 is linearly polarized and the second Raman beam R2 is linearly polarized orthogonal to R1.

In 802, the second beam comprising the orthogonally polarized Raman beam pair is sent into a beam splitter and merged with the MOT beam path. In some embodiments, the beam splitter is NPBS 206 of FIG. 2, the MOT beam is beam 214 of FIG. 2, and the merged beam is beam 216 of FIG. 2. For example, merged beam 216 comprises a vertical MOT beam that has the same polarization and path as Raman beams R1 and R2.

In 804, the second beam comprising the orthogonally polarized Raman beam pair is sent into a path-combining polarizing beam splitter where a first polarization component (A) is sent to a quarter-wave plate and a second polarization component (B) is sent to a series of mirrors. In some embodiments, the second beam is beam 216 of FIG. 2, the path-combining polarizing beam splitter is PBS 222 of FIG. 2, the quarter-wave plate is QWP 228 of FIG. 2, and the series of mirrors are mirror 226, mirror 240 and mirror 238 of FIG. 2.

In 806, the first polarization component of the Raman beam pair (A) is passed through a quarter-wave plate to an atomic interaction region, and the process ends. In some embodiments, the first polarization component of the Raman beam pair is beam 220 of FIG. 2, the quarter-wave plate is QWP 228 of FIG. 2, and the atomic interaction region is atomic interaction region 232 of FIG. 2.

In 808, the second polarization component of the Raman beam pair (B) is reflected through a series of mirrors to direct the beam to a second quarter-wave plate. In some embodiments, the second polarization component of the Raman beam pair is beam 224 of FIG. 2 and the series of mirrors are mirror 226, mirror 240 and mirror 238 of FIG. 2.

In 810, the second polarization component of the Raman beam pair (B) is passed through a quarter-wave plate to an atomic interaction region, and the process ends. In some embodiments, the quarter-wave plate is QWP 236 of FIG. 2 and the atomic interaction region is atomic interaction region 232 of FIG. 2.

In some embodiments, the interferometric measurement pulse sequence using MOT and Raman beams in the interaction region is followed by a detection pulse sequence to create a detection florescence signal that is measured by a photodiode (e.g., as in 622 of FIG. 6).

Figure 9:
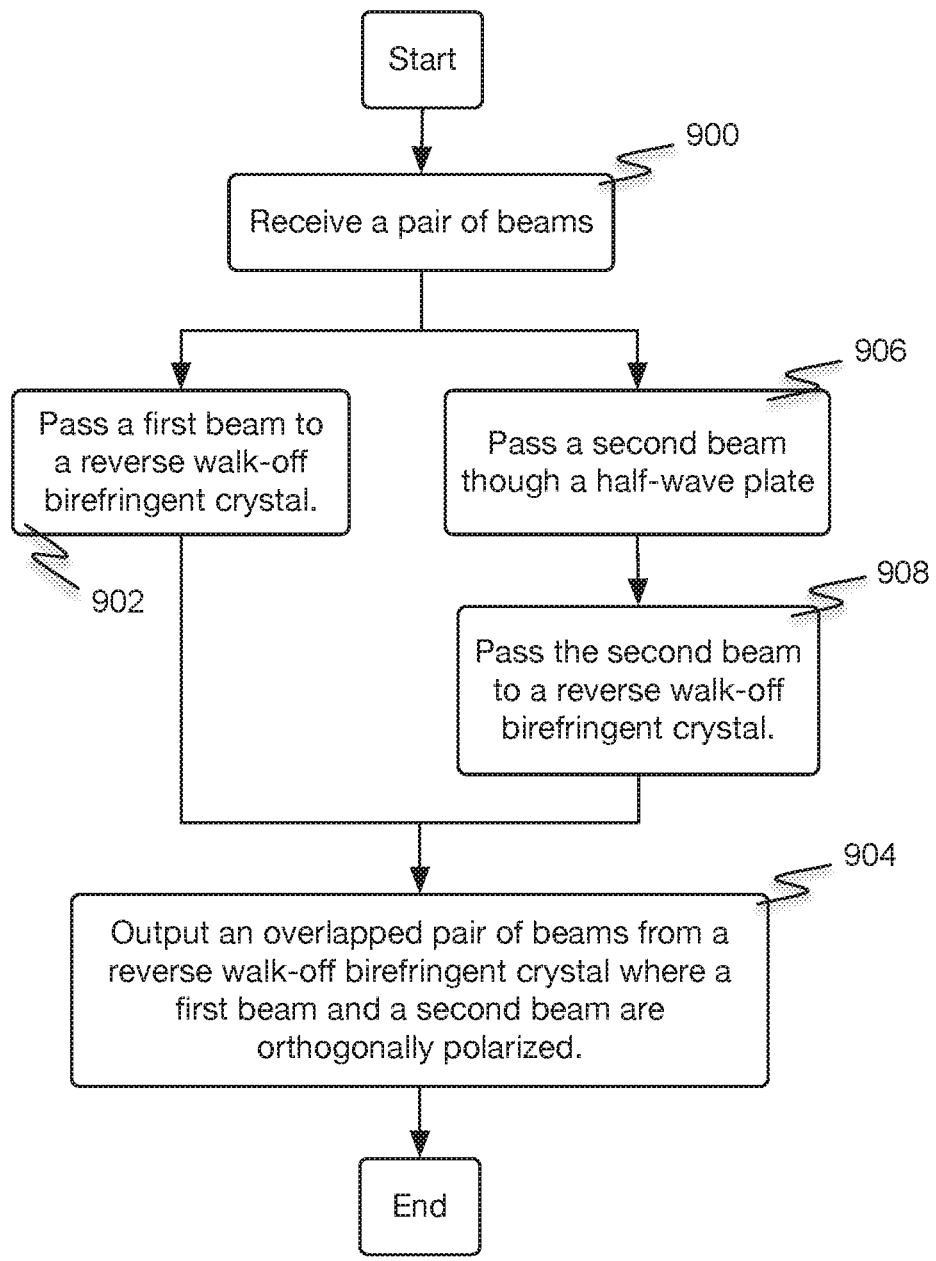
FIG. 9 is a flow diagram illustrating an embodiment of a beam combiner for combining and overlapping two distinct beams.

FIG. 9 is a flow diagram illustrating an embodiment of a beam combiner for combining and overlapping two distinct beams. In some embodiments, the process of FIG. 9 is executed by optical coupling and multiplexing unit 114 of FIG. 1. In the example shown in 900, a pair of beams is received. For example, a first Raman beam R1 and second Raman beam R2 with the same linear polarization are received.

In 902, a first beam is passed to a reverse walk-off birefringent crystal, and control passes to 904. In some embodiments, the first beam is beam 306 of FIG. 3 and the reverse walk-off birefringent crystal is birefringent crystal 304 of FIG. 3. In 906, a second beam is passed through a half-wave plate, and control passes to 908. For example, the half-wave plate processes the second beam to have orthogonal linear polarization with respect to the first beam. In some embodiments, the second beam is beam 308 of FIG. 3 and the half-wave plate is half-wave plate 302 of FIG. 3. In 908, the second beam is passed to a reverse walk-off birefringent crystal, and control passes to 904. In some embodiments, the second beam is beam 308 of FIG. 3 and the reverse walk-off birefringent crystal is birefringent crystal 304 of FIG. 3.

In 904, an overlapped pair of beams is output from a reverse walk-off birefringent crystal where a first beam and a second beam are orthogonally polarized and the process ends. In some embodiments, the output beam is beam 312 of FIG. 3. For example, the output beam comprises a first Raman beam R1 that is linearly polarized and a second Raman beam R2 that is linearly polarized orthogonal to R1.

Figure 10:
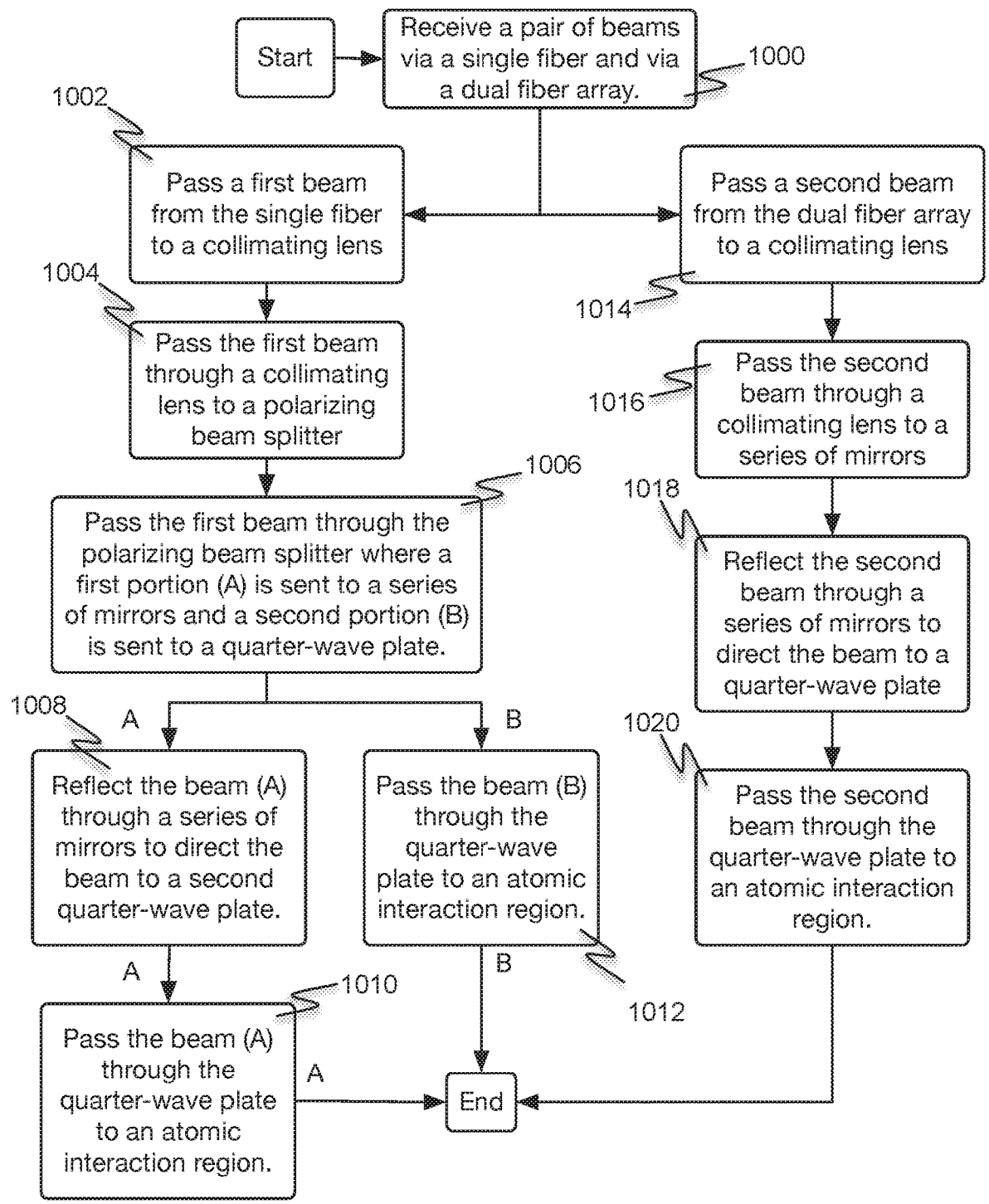
FIG. 10 is a flow diagram illustrating an embodiment of an atomic interferometer system.

FIG. 10 is a flow diagram illustrating an embodiment of an atomic interferometer system. In some embodiments, the process of FIG. 10 is executed by the atomic interferometer 120 of FIG. 1. In some embodiments, the process of FIG. 10 is executed by atomic interferometer 400 of FIG. 4. In the example shown in 1000, a pair of beams is received via a single fiber and via a dual fiber array. For example, the single fiber contains a first Raman beam R1 and a MOT beam and the dual fiber array contains a second Raman beam R2 and a MOT beam. In some embodiments, the single fiber is fiber 402 of FIG. 4 and the dual fiber array is dual fiber array 404 of FIG. 4.

In 1002, a first beam is passed from the single fiber to a collimating lens, and control passes to 1004. In some embodiments, the first beam is beam 408 of FIG. 4. In 1004, the first beam is passed through a collimating lens to a polarizing beam splitter (PBS), and control passes to 1006. In some embodiments. the collimating lens is collimating lens 414 of FIG. 4. In 1006, the first beam is passed through the polarizing beam splitter where a first portion (A) is sent to a series of mirrors and a second portion (B) is sent to a quarter-wave plate. In some embodiments, the polarizing beam splitter is polarizing beam splitter 420 of FIG. 4.

In 1008, the first portion beam (A) is reflected through a series of mirrors to direct the beam to a second quarter-wave plate, and control passes to 1010. In some embodiments, the series of mirrors are mirror 412 of FIG. 4 and mirror 424 of FIG. 4. For example, the first portion beam (A) contains a MOT beam for transverse illumination of the atomic interaction region. In 1010, the first portion beam (A) is passed through the quarter-wave plate to an atomic interaction region and the process ends, and the process ends. In some embodiments, the quarter-wave plate is quarter-wave plate 426 of FIG. 4 and atomic interaction region is atomic interaction region 430 of FIG. 4.

In 1012, the second portion beam (B) is passed through the quarter-wave plate to an atomic interaction region, and the process ends. In some embodiments, the quarter-wave plate is quarter-wave plate 422 of FIG. 4 and the atomic interaction region is atomic interaction region 430 of FIG. 4. For example, the second portion beam (B) contains a first Raman beam R1 or a MOT beam depending on the state of the atomic interferometer measurement cycle.

In 1014, a second beam is passed from a dual fiber array to a collimating lens, and control passes to 1016. In some embodiments, the second beam is beam 410 of FIG. 4. In 1016, the second beam is passed through a collimating lens to a series of mirrors, and control passes to 1018. In some embodiments. the collimating lens is collimating lens 416 of FIG. 4. In 1018, the second beam is reflected through a series of mirrors to direct the beam to a quarter-wave plate, and control passes to 1020. In some embodiments, the series of mirrors are mirror 438 of FIG. 4 and mirror 436 of FIG. 4. For example, the second beam contains a second Raman beam R2 or a MOT beam depending on the state of the atomic interferometer measurement cycle. In 1020, the second beam is passed through the quarter-wave plate to an atomic interaction region, and the process ends. In some embodiments, the quarter-wave plate is quarter-wave plate 434 of FIG. 4 and atomic interaction region is atomic interaction region 430 of FIG. 4.

In some embodiments, the interferometric measurement pulse sequence using MOT and Raman beams in the interaction region is followed by a detection pulse sequence to create a detection florescence signal that is measured by a photodiode (e.g., as in 622 of FIG. 6).

Figure 11:
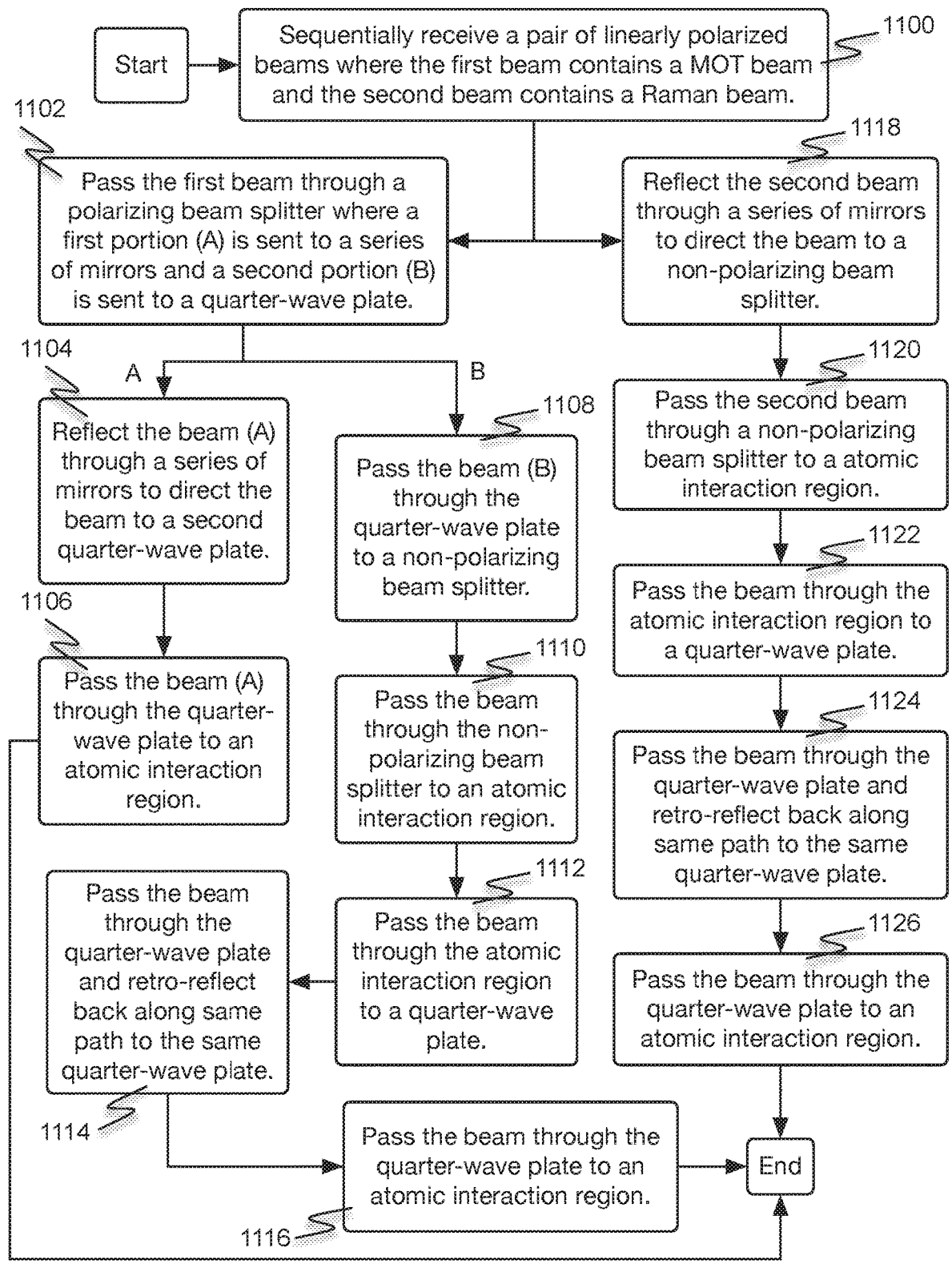
FIG. 11 is a flow diagram illustrating an embodiment of an atomic interferometer system.

FIG. 11 is a flow diagram illustrating an embodiment of an atomic interferometer system. In some embodiments, the process of FIG. 11 is executed by the atomic interferometer 120 of FIG. 1. In some embodiments, the process of FIG. 11 is executed by atomic interferometer 500 of FIG. 5. In the example shown in 1100, a pair of linearly polarized beams is received sequentially where the first beam contains a MOT beam and the second beam contains a Raman beam. In some embodiments, the first received beam is beam 502 of FIG. 5 and the second received beam is beam 504 of FIG. 5.

In 1102, the first beam is passed through a polarizing beam splitter where a first portion (A) is sent to a series of mirrors and a second portion (B) is sent to a quarter-wave plate. In some embodiments, the first beam is MOT beam 508 of FIG. 5 and the polarizing beam splitter is PBS 514 of FIG. 5.

In 1104, the first portion beam (A) is reflected through a series of mirrors to direct the beam to a second quarter-wave plate, and control passes to 1106. In some embodiments, the series of mirrors are mirror 512 of FIG. 5 and mirror 528 of FIG. 5. For example, the first portion beam (A) contains a MOT beam for transverse illumination of the atomic interaction region. In 1106, the first portion beam (A) is passed through the quarter-wave plate to an atomic interaction region, and the process ends. In some embodiments, the quarter-wave plate is quarter-wave plate 530 of FIG. 5 and atomic interaction region is atomic interaction region 532 of FIG. 5.

In 1108, the second portion beam (B) is passed through the quarter-wave plate to a non-polarizing beam splitter, and control passes to 1110. In some embodiments, the second portion beam (B) is beam 540 of FIG. 5 and the quarter-wave plate is quarter-wave plate 516 of FIG. 5. In 1110, the beam is passed through the non-polarizing beam splitter to an atomic interaction region, and control passes to 1112. In some embodiments, the beam is beam 544 of FIG. 5 and the non-polarizing beam splitter is NPBS 518 of FIG. 5. In 1112, the beam is passed through the atomic interaction region to a quarter-wave plate, and control passes to 1114. In some embodiments, the beam is beam 522 of FIG. 5 and the atomic interaction region is atomic interaction region 532 of FIG. 5.

In 1114, the beam is passed through the quarter-wave plate and retro-reflected back along the same path to the same quarter-wave plate, and control passes to 1116. In some embodiments, the quarter-wave plate is the quarter-wave plate 536 of FIG. 5 and the mirror for retro-reflection is mirror 538 of FIG. 5. In 1116, the beam is passed through the quarter-wave plate to an atomic interaction region, and the process ends. In some embodiments, the quarter-wave plate is the quarter-wave plate 536 of FIG. 5 and the atomic interaction region is atomic interaction region 532 of FIG. 5.

In 1118, the second beam is reflected through a series of mirrors to direct the beam to a non-polarizing beam splitter, and control passes to 1120. In some embodiments, the second beam is Raman beam 510 of FIG. 5 and the mirror is mirror 520 of FIG. 5. In 1120, the second beam is passed through a non-polarizing beam splitter to an atomic interaction region, and control passes to 1122. In some embodiments, the non-polarizing beam splitter is NPBS 518 of FIG. 5 and the beam entering the atomic interaction region is beam 522 of FIG. 5. In 1122, the beam passes through the atomic interaction region to a quarter wave plate. In some embodiments, the quarter wave plate is quarter-wave plate 536 of FIG. 5. In 1124, the beam is passed through the quarter-wave plate and retro-reflected back along the same path to the same quarter-wave plate, and control passes to 1126. In some embodiments, the quarter-wave plate is quarter-wave plate 536 of FIG. 5 and the mirror for retro-reflection is mirror 538 of FIG. 5. In 1126, the beam is passed through the quarter-wave plate to an atomic interaction region, and the process ends. In some embodiments, the quarter-wave plate is the quarter-wave plate 536 of FIG. 5 and the atomic interaction region is atomic interaction region 532 of FIG. 5.

In some embodiments, the interferometric measurement pulse sequence using MOT and Raman beams in the interaction region is followed by a detection pulse sequence to create a detection florescence signal that is measured by a photodiode (e.g., as in 622 of FIG. 6).

Figure 12:
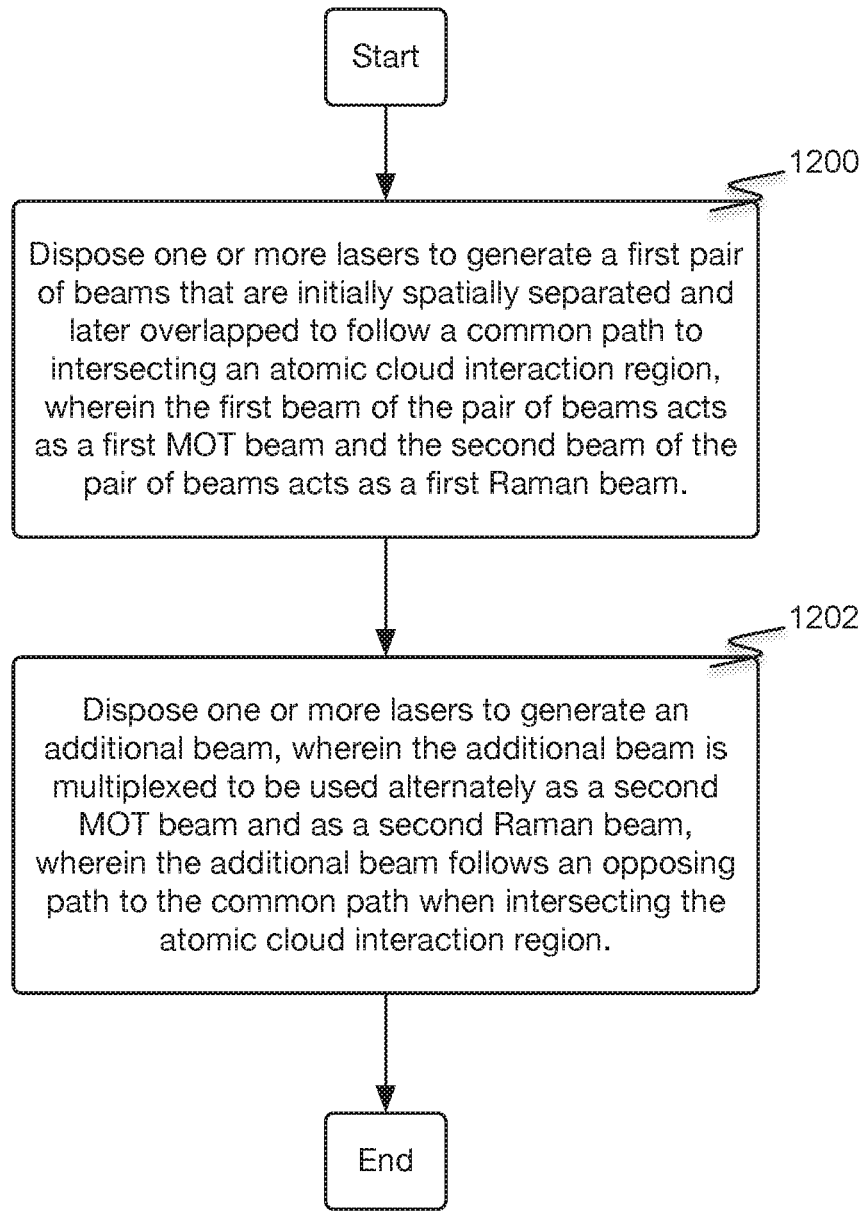
FIG. 12 is a flow diagram illustrating an embodiment for a method for atom interferometry.

FIG. 12 is a flow diagram illustrating an embodiment for a method for atom interferometry. In some embodiments, the process of FIG. 12 is used to create the system of FIG. 1. In the example shown, in 1200, one or more lasers is disposed to generate a first pair of beams that are initially spatially separated and later overlapped to follow a common path to intersecting an atomic cloud interaction region, where the first beam of the pair of beams acts as a first MOT beam and the second beam of the pair of beams acts as a first Raman beam, and control passes to 1202. In 1202, one or more lasers is disposed to generate an additional beam, where the additional beam is multiplexed to be used alternately as a second MOT beam and as a second Raman beam, where the additional beam follows an opposing path to the common path when intersecting the atomic cloud interaction region and the process ends.

Figure 13:
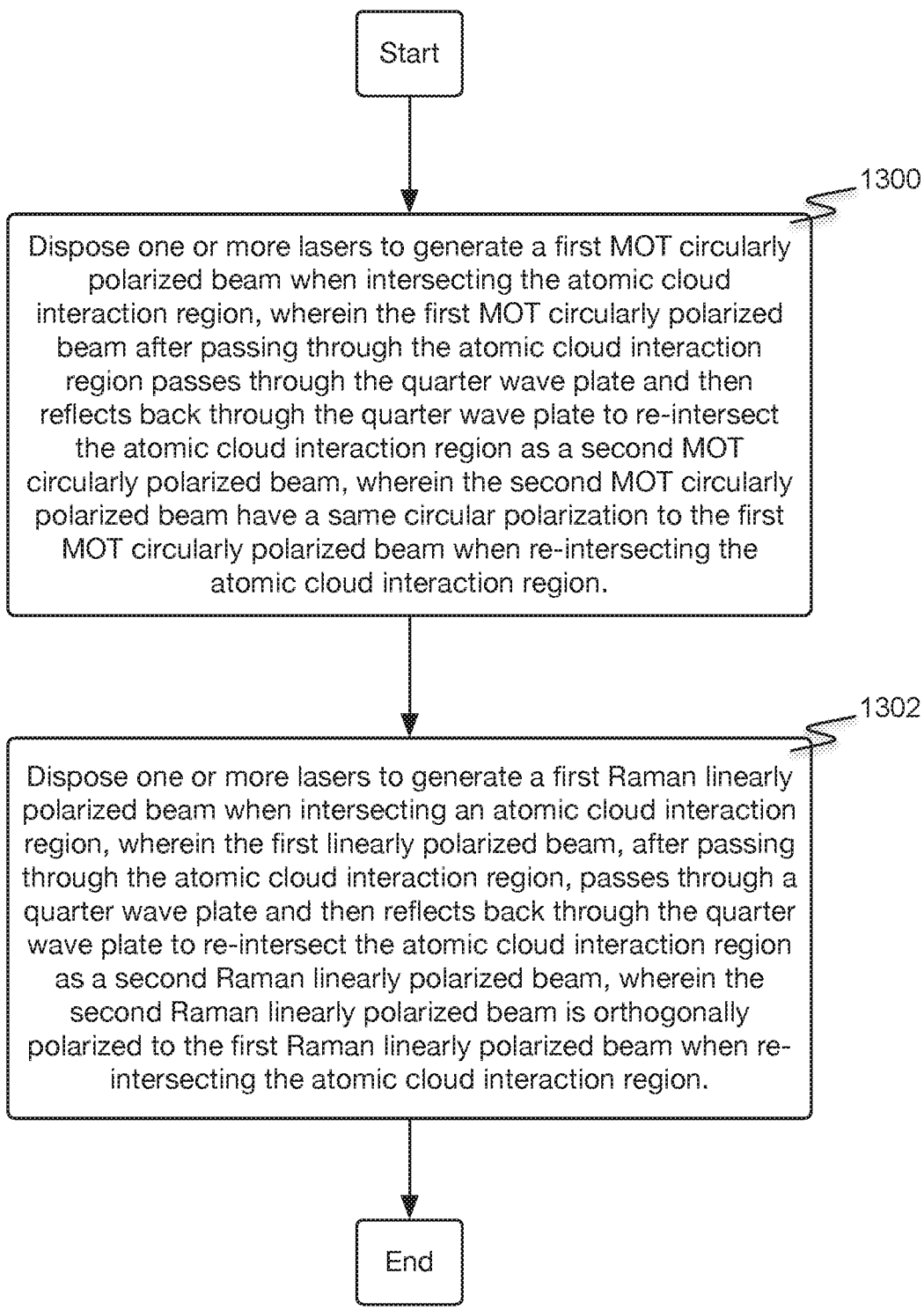
FIG. 13 is a flow diagram illustrating an embodiment for a method for atom interferometry.

FIG. 13 is a flow diagram illustrating an embodiment for a method for atom interferometry. In some embodiments, the process of FIG. 13 is used to create the system of FIG. 1 In 1300, one or more lasers is disposed to generate a first MOT circularly polarized beam when intersecting the atomic cloud interaction region, where the first MOT circularly polarized beam after passing through the atomic cloud interaction region passes through the quarter wave plate and then reflects back through the quarter wave plate to re-intersect the atomic cloud interaction region as a second MOT circularly polarized beam, where the second MOT circularly polarized beam have a same circular polarization to the first MOT circularly polarized beam when re-intersecting the atomic cloud interaction region and control passes to 1302. In the example shown, in 1302 one or more lasers is disposed to generate a first Raman linearly polarized beam when intersecting an atomic cloud interaction region, where the first linearly polarized beam, after passing through the atomic cloud interaction region, passes through a quarter wave plate and then reflects back through the quarter wave plate to re-intersect the atomic cloud interaction region as a second Raman linearly polarized beam, where the second Raman linearly polarized beam is orthogonally polarized to the first Raman linearly polarized beam when re-intersecting the atomic cloud interaction region, and the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for atom interferometry, comprising:
   a laser disposed to generate a first pair of beams that are initially spatially separated and generate an additional beam;
   a first set of optics to overlap the first pair of beams to follow a common path, wherein the first beam of the pair of beams acts as a first MOT beam and the second beam of the pair of beams acts as a first Raman beam; and
   a second set of optics to cause the additional beam to follow an opposing path, wherein the additional beam is multiplexed to be used alternately as a second MOT beam and as a second Raman beam, wherein the additional beam follows the opposing path both when the additional beam has been multiplexed to act as the second MOT beam and when the additional beam has been multiplexed to act as the second Raman beam; and
   an atomic cloud interaction region, wherein the atomic cloud interaction region is intersected by the first pair of beams that follows the common path and is intersected by the additional beam that follows the opposing path, wherein the common path and the opposing path intersect the atomic cloud interaction region from opposite directions.

2. The system of claim 1, wherein the first Raman beam is linearly polarized and the second Raman beam is linearly polarized orthogonal to the first Raman beam.

3. The system of claim 2, wherein the second Raman beam transmits through a polarizing beam splitter and the first Raman beam reflects 90 degrees by the polarizing beam splitter.

4. The system of claim 1, wherein the first Raman beam transmits through a first quarter wave plate prior to intersecting the atomic cloud interaction region and the second Raman beam transmits through a second quarter wave plate prior to intersecting the atomic cloud region, wherein the first Raman beam and the second Raman beam have opposite circular polarizations when intersecting the atomic cloud interaction region.

5. The system of claim 1, wherein the second Raman beam is re-used as the second MOT beam after changing frequency to match the first MOT beam, and wherein the first Raman beam is turned off.

6. The system of claim 5, wherein the second MOT beam, which is linearly polarized, is transmitted through a polarizing beam splitter in a direction orthogonal to the first MOT beam, which is also transmitted through the polarizing beam splitter.

7. The system of claim 1, wherein the first MOT beam on the common path transmits through a first quarter wave plate prior to intersecting the atomic cloud interaction region and the second MOT beam on the opposing path transmits through a second quarter wave plate prior to intersecting the atomic cloud interaction region, wherein the first MOT beam and the second MOT beam have identical circular polarizations when intersecting the atomic cloud interaction region.

8. The system of claim 1, wherein the additional beam is transmitted through a fiber, wherein the additional beam is collimated and is passed through a quarter wave plate before intersecting an atomic cloud interaction region.

9. The system of claim 1, wherein the first pair of beams have orthogonal linear polarizations, wherein the first pair of beams are transmitted through a dual fiber array, wherein the first pair of beams are collimated and are passed through a quarter wave plate to become two opposite-circularly polarized beams before intersecting an atomic cloud interaction region.

10. A method for atom interferometry, comprising:
disposing a laser to generate a first pair of beams that are initially spatially separated and generate an additional beam;
overlapping the first pair of beams, using a first set of optics, to follow a common path, wherein the first beam of the pair of beams acts as a first MOT beam and the second beam of the pair of beams acts as a first Raman beam; and
causing the additional beam, using a second set of optics, to following an opposing path, wherein the additional beam is multiplexed to be used alternately as a second MOT beam and as a second Raman beam, wherein the additional beam follows an opposing path both when the additional beam has been multiplexed to act as the second MOT beam and when the additional beam has been multiplexed to act as the second Raman beam; and
causing the first pair of beams to intersect an atomic cloud interaction region by following the common path; and
causing the additional beam to intersect the atomic cloud interaction region by following the opposing path, wherein the common path and the opposing path intersect the atomic cloud interaction region from opposite directions.

11. The method of claim 10, wherein the first Raman beam is linearly polarized and the second Raman beam is linearly polarized orthogonal to the first Raman beam.

12. The method of claim 11, wherein the second Raman beam transmits through a polarizing beam splitter and the first Raman beam reflects 90 degrees by the polarizing beam splitter.

13. The method of claim 10, wherein the first Raman beam transmits through a first quarter wave plate prior to intersecting the atomic cloud interaction region and the second Raman beam transmits through a second quarter wave plate prior to intersecting the atomic cloud region, wherein the first Raman beam and the second Raman beam have opposite circular polarizations when intersecting the atomic cloud interaction region.

14. The method of claim 10, wherein the second Raman beam is re-used as the second MOT beam after changing frequency to match the first MOT beam, and wherein the first Raman beam is turned off.

15. The method of claim 14, wherein the second MOT beam, which is linearly polarized, is transmitted through a polarizing beam splitter in a direction orthogonal to the first MOT beam, which is also transmitted through the polarizing beam splitter.

16. The method of claim 10, wherein the first MOT beam on the common path transmits through a first quarter wave plate prior to intersecting the atomic cloud interaction region and the second MOT beam on the opposing path transmits through a second quarter wave plate prior to intersecting the atomic cloud interaction region, wherein the first MOT beam and the second MOT beam have identical circular polarizations when intersecting the atomic cloud interaction region.

* * * * *